(12) United States Patent
Chen et al.

(10) Patent No.: US 12,269,158 B2
(45) Date of Patent: Apr. 8, 2025

(54) SOFT ROBOTIC GRIPPER FOR BERRY HARVESTING

(71) Applicant: BOARD OF TRUSTEES OF THE UNIVERSITY OF ARKANSAS, Fayetteville, AR (US)

(72) Inventors: Yue Chen, Fayetteville, AR (US); Anthony L. Gunderman, Fayetteville, AR (US); Jeremy A. Collins, Fayetteville, AR (US)

(73) Assignee: Board Of Trustees Of The University Of Arkansas, Little Rock, AR (US)

( * ) Notice: Subject to any disclaimer, the term of this patent is extended or adjusted under 35 U.S.C. 154(b) by 747 days.

(21) Appl. No.: 17/525,416

(22) Filed: Nov. 12, 2021

(65) Prior Publication Data
US 2022/0142050 A1  May 12, 2022

Related U.S. Application Data

(60) Provisional application No. 63/155,075, filed on Mar. 1, 2021, provisional application No. 63/113,071, filed on Nov. 12, 2020.

(51) Int. Cl.
*B25J 15/12* (2006.01)
*A01D 46/253* (2006.01)
(Continued)

(52) U.S. Cl.
CPC .......... *B25J 15/12* (2013.01); *A01D 46/253* (2013.01); *A01D 46/30* (2013.01); *B25J 9/1075* (2013.01);
(Continued)

(58) Field of Classification Search
CPC ......... G05D 1/0212; G05B 2219/39532; B25J 15/12; B25J 15/103; B25J 13/085; B25J 13/08; B25J 9/1664; B25J 9/162; B25J 9/1075; B25J 5/00; A01D 46/30; A01D 46/253

See application file for complete search history.

(56) References Cited

U.S. PATENT DOCUMENTS

| 2,772,514 | A | * | 12/1956 | Mangnall | A01G 3/00 231/4 |
| 3,077,720 | A | * | 2/1963 | Grove | A01D 46/24 56/328.1 |

(Continued)

FOREIGN PATENT DOCUMENTS

| CN | 108283056 A | * | 7/2018 | ............. A01D 46/24 |
| CN | 110877344 A | * | 3/2020 | .......... B25J 15/0023 |

(Continued)

OTHER PUBLICATIONS

C. S. Commission. "All Market Reports," 2020. https://www.calstrawberry.com/en-us/market-data/retail-category-trends.
(Continued)

*Primary Examiner* — Arpad Fabian-Kovacs
(74) *Attorney, Agent, or Firm* — Keith A. Vogt; Keith Vogt Ltd.

(57) ABSTRACT

A berry harvesting berries system including a mobile platform and a tendon-driven gripper having fingers made of a compliant material, which prevents unwanted damage to the berries.

4 Claims, 14 Drawing Sheets

(51) Int. Cl.
*A01D 46/30* (2006.01)
*B25J 9/10* (2006.01)
*B25J 9/16* (2006.01)
*B25J 13/08* (2006.01)
*B25J 15/10* (2006.01)
*B25J 19/00* (2006.01)
*G05D 1/00* (2006.01)
*B25J 5/00* (2006.01)

(52) U.S. Cl.
CPC ............. *B25J 9/162* (2013.01); *B25J 13/085* (2013.01); *B25J 15/103* (2013.01); *B25J 19/0075* (2013.01); *G05D 1/0212* (2013.01); *B25J 5/00* (2013.01); *B25J 9/1664* (2013.01); *B25J 13/08* (2013.01)

(56) References Cited

U.S. PATENT DOCUMENTS

| | | | | |
|---|---|---|---|---|
| 3,232,034 | A * | 2/1966 | Green | A01D 46/253 56/332 |
| 3,522,697 | A * | 8/1970 | Shaff | A01D 46/253 56/330 |
| 7,810,305 | B2 | 10/2010 | Macidull | |
| 8,938,941 | B2 * | 1/2015 | Minelli | A01D 46/264 56/332 |
| 9,554,512 | B2 | 1/2017 | Davidson et al. | |
| 9,981,377 | B2 * | 5/2018 | Morin | B25J 9/142 |
| 10,757,861 | B2 | 9/2020 | Robertson et al. | |
| 2011/0047951 | A1 * | 3/2011 | Moore | A01D 46/24 56/328.1 |
| 2016/0114482 | A1 * | 4/2016 | Lessing | B25J 15/12 294/196 |
| 2016/0150729 | A1 * | 6/2016 | Moore | A01G 3/08 701/50 |
| 2016/0235006 | A1 * | 8/2016 | Moore | A01B 69/008 |
| 2018/0361596 | A1 * | 12/2018 | Beri | B25J 15/0023 |
| 2019/0047156 | A1 * | 2/2019 | Curhan | B25J 15/12 |
| 2019/0061170 | A1 * | 2/2019 | Curhan | B25J 15/0616 |
| 2021/0394367 | A1 * | 12/2021 | Correll | B25J 9/1664 |
| 2022/0161427 | A1 * | 5/2022 | Yerazunis | B25J 9/1674 |
| 2022/0161444 | A1 * | 5/2022 | Yerazunis | B25J 13/08 |
| 2024/0042623 | A1 * | 2/2024 | Chen | B25J 15/103 |

FOREIGN PATENT DOCUMENTS

| | | | | |
|---|---|---|---|---|
| CN | 111993452 | A * | 11/2020 | B25J 15/12 |
| CN | 113196946 | A * | 8/2021 | A01D 46/30 |
| CN | 113366973 | A * | 9/2021 | A01D 45/002 |
| CN | 114175926 | A * | 3/2022 | A01D 46/24 |
| CN | 114931026 | A * | 8/2022 | B25J 15/10 |
| WO | 2020/006086 | A1 | 1/2020 | |
| WO | 2020/089768 | A1 | 5/2020 | |
| WO | WO-2023115128 | A1 * | 7/2024 | B25J 19/023 |

OTHER PUBLICATIONS

"Fresh Berries Market—Growth, Trends, and Forecast (2020-2025)."

J. Weisburger, "Mechanisms of action of antioxidants as exemplified in vegetables, tomatoes and tea," Food and Chemical Toxicology, vol. 37, No. 9-10, pp. 943-948, Sep.-Oct. 1999, 1999.

G. Stoner, L. Wang, and B. Casto, "Laboratory and clinical studies of cancer chemoprevention by antioxidants in berries," Carcinogenesis, vol. 29, No. 9, pp. 1665-1674, Sep. 2008, 2008.

B. Yang, and M. Kortesniemi, "Clinical evidence on potential health benefits of berries," Current Opinion in Food Science, vol. 2, pp. 36-42, Apr. 2015, 2015.

W. Raghupathi, and V. Raghupathi, "An Empirical Study of Chronic Diseases in the United States: A Visual Analytics Approach to Public Health," International Journal of Environmental Research and Public Health, vol. 15, No. 3, Mar. 2018, 2018.

A. Tinker. How to Improve Patient Outcomes for Chronic Diseases and Comorbidities.

"The Growing Crisis of Chronic Disease in the United States," Available online: https://www.fightchronicdisease.org/sites/default/files/docs/GrowingCrisisofChronicDiseaseintheUSfactsheet_81009.pdf.

C. Buttorff, T. Ruder, and M. Bauman, "Multiple Chronic Conditions in the United States," 2017. https://www.rand.org/content/dam/rand/pubs/tools/TL200/TL221/RAND_TL221.pdf.

H. K. Hall, and R. C. Funt, Blackberries and Their Hybrids: Crop Production Science and Horticulture, 2017.

M. Bolda, L. Tourte, J. Murdock, and D. A. Sumner, Sample Costs to Produce and Harvest Fresh Market Blackberries Primocane Bearing, 2018. https://ucanr.edu/sites/uccesc/files/299753.pdf.

M. Edgley, D. Close, and P. Measham, "Red drupelet reversion in blackberries: A complex of genetic and environmental factors," Scientia Horticulturae, vol. 272, Oct. 15, 2020, 2020.

M. Edgley, D. C. Close, and P. Measham, "Effects of climatic conditions during harvest and handling on the postharvest expression of red drupelet reversion in blackberries," Scientia Horticulturae, vol. 253, pp. 399-404, 2019.

Y. Xiong, P. From, and V. Isler, "Design and Evaluation of a Novel Cable-Driven Gripper with Perception Capabilities for Strawberry Picking Robots," 2018 Ieee International Conference on Robotics and Automation (ICRA), pp. 7384-7391, 2018, 2018.

S. Hayashi, K. Shigematsu, S. Yamamoto, K. Kobayashi, Y. Kohno, J. Kamata, and M. Kurita, "Evaluation of a strawberry-harvesting robot in a field test," Biosystems Engineering, vol. 105, No. 2, pp. 160-171, Feb. 2010, 2010.

Q. Feng, W. Zou, P. Fan, C. Zhang, and X. Wang, "Design and test of robotic harvesting system for cherry tomato," International Journal of Agricultural and Biological Engineering, 11(1),96-100. doi:10.25165/j.ijabe.20181101.2853.

C. Bac, J. Hemming, B. van Tuijl, R. Barth, E. Wais, and E. van Henten, "Performance Evaluation of a Harvesting Robot for Sweet Pepper," Journal of Field Robotics, vol. 34, No. 6, pp. 1123-1139, Sep. 2017, 2017.

G. Lobos, C. Moggia, J. Retamales, C. Sanchez, O. VanKooten, and F. Brouns, "Effect of Mechanized (Automotive or Shaker) vs. Hand Harvest on Postharvest Fruit Quality of Blueberries (*Vaccinium corymbosum* L.)," X International Symposium on Vaccinium and Other Superfruits, vol. 1017, pp. 135-140, 2014, 2014.

L. DeVetter, W. Yang, F. Takeda, S. Korthuis, and C. Li, "Modified Over-the-Row Machine Harvesters to Improve Northern Highbush Blueberry Fresh Fruit Quality," Agriculture-Basel, vol. 9, No. 1, Jan. 2019, 2019.

Khan, and M. S. Alam, "Design and Compliance Control of a Robotic Gripper for Orange Harvesting," 2019 22nd International Multitopic Conference (INMIC), Islamabad, Pakistan, 2019, pp. 1-5, doi: 10.1109/INMIC48123.2019.9022758.

A. De Preter, J. Anthonis, and J. De Baerdemaeker, "Development of a Robot for Harvesting Strawberries," Ifac Papersonline, vol. 51, No. 17, pp. 14-19, 2018, 2018.

H. Kang, and C. Chen, "Fruit Detection and Segmentation for Apple Harvesting Using Visual Sensor in Orchards," Sensors, vol. 19, No. 20, Oct. 2, 2019, 2019.

P. J. From, L. Grimstad, S. Pearson, and G. Cielniak, "RASberry—Robotic and Autonomous Systems for Berry Production," ASME, Jun. 2018.

J. Brown, and S. Sukkarieh, "Design and evaluation of a modular robotic plum harvesting system utilizing soft components," Journal of Field Robotics, 2020.

D. Rus, and M. Tolley, "Design, fabrication and control of soft robots," Nature, vol. 521, No. 7553, pp. 467-475, May 28, 2015, 2015.

J. Hughes, U. Culha, F. Giardina, F. Guenther, A. Rosendo, and F. Iida, "Soft Manipulators and Grippers: A Review," Frontiers in Robotics and Ai, vol. 3, Nov. 16, 2016, 2016.

J. Shintake, V. Cacucciolo, D. Floreano, and H. Shea, "Soft Robotic Grippers," Advanced Materials, vol. 30, No. 29, Jul. 19, 2018, 2018.

(56) References Cited

OTHER PUBLICATIONS

R. Martinez, A. Glavan, C. Keplinger, A. Oyetibo, and G. Whitesides, "Soft Actuators and Robots that Are Resistant to Mechanical Damage," Advanced Functional Materials, vol. 24, No. 20, pp. 3003-3010, May 2014, 2014.

T. Hassan, M. Manti, G. Passetti, N. d'Elia, M. Cianchetti, and C. Laschi, "Design and development of a bio-inspired, under-actuated soft gripper," 2015 37th Annual International Conference of the Ieee Engineering in Medicine and Biology Society (EMBC), pp. 3619-3622, 2015, 2015.

J. Zhou, X. Chen, Y. Chang, J. Lu, C. Leung, Y. Chen, Y. Hu, and Z. Wang, "A Soft-Robotic Approach to Anthropomorphic Robotic Hand Dexterity," Ieee Access, vol. 7, pp. 101483-101495, 2019, 2019.

J. G. A. Santos, "Bio-inspired robotic gripper with hydrogel-silicone soft skin and 3D printed endoskeleton," Engineering Physics, University of Coimbra, 2017.

J. Zhou, S. Chen, and Z. Wang, "A Soft-Robotic Gripper With Enhanced Object Adaptation and Grasping Reliability," Ieee Robotics and Automation Letters, vol. 2, No. 4, pp. 2287-2293, Oct. 2017, 2017.

D. Venter, and S. Dirven, "Self Morphing Soft-Robotic Gripper for Handling and Manipulation of Delicate Produce in Horticultural Applications," 2017 24th International Conference on Mechatronics and Machine Vision in Practice (M2vip), pp. 401-406, 2017, 2017.

A. Tomlik-Wyremblewska, J. Zielinski, and M. Guzicka, "Morphology and anatomy of blackberry pyrenes (*Rubus L., Rosaceae*) elementary studies of the European representatives of the genus *Rubus L. Flora*, 205(6), 370-375," 2010.

Z. Wang, D. Chathuranga, and S. Hirai, "3D Printed Soft Gripper for Automatic Lunch Box Packing," 2016 Ieee International Conference on Robotics and Biomimetics (Robio), pp. 503-508, 2016, 2016.

K. Galloway, Y. Chen, E. Templeton, B. Rife, I. Godage, and E. Barth, "Fiber Optic Shape Sensing for Soft Robotics," Soft Robotics, vol. 6, No. 5, pp. 671-684, Oct. 1, 2019, 2019.

Y. Chen, L. Wang, K. Galloway, I. Godage, N. Simaan, and E. Barth, "Modal-Based Kinematics and Contact Detection of Soft Robots," Soft Robotics, 2020.

T. Park, K. Kim, S. Oh, and Y. Cha, "Electrohydraulic Actuator for a Soft Gripper," Soft Robotics, vol. 7, No. 1, pp. 68-75, Feb. 1, 2020, 2020.

K. Mizushima, T. Oku, Y. Suzuki, T. Tsuji, and T. Watanabe, "Multi-fingered robotic hand based on hybrid mechanism of tendon-driven and jamming transition," in IEEE International Conference on Soft Robotics (RoboSoft), Livorno, 2018, pp. 376-381.

D. Rucker, and R. Webster, "Statics and Dynamics of Continuum Robots With General Tendon Routing and External Loading," Ieee Transactions on Robotics, vol. 27, No. 6, pp. 1033-1044, Dec. 2011, 2011.

G. Runge, T. Preller, S. Zellmer, S. Blankemeyer, M. Kreuz, G. Garnweitner, and A. Raatz, "SpineMan: Design of a Soft Robotic Spine-Like Manipulator for Safe Human-Robot Interaction," 2015 Ieee/rsj International Conference on Intelligent Robots and Systems (Iros), pp. 1103-1110, 2015, 2015.

C. Lee, M. Kim, Y. Kim, N. Hong, S. Ryu, H. Kim, and S. Kim, "Soft Robot Review," International Journal of Control Automation and Systems, vol. 15, No. 1, pp. 3-15, Feb. 2017, 2017.

Y. Zhang, and M. Lu, "A review of recent advancements in soft and flexible robots for medical applications," International Journal of Medical Robotics and Computer Assisted Surgery, vol. 16, No. 3, Jun. 2020, 2020.

G. Gerboni, A. Diodato, G. Ciuti, M. Cianchetti, and A. Menciassi, "Feedback Control of Soft Robot Actuators via Commercial Flex Bend Sensors," Ieee-Asme Transactions on Mechatronics, vol. 22, No. 4, pp. 1881-1888, Aug. 2017, 2017.

"FlexiForce Integration Guides: Best Practices in Electrical Integration," 2020. https://www.tekscan.com/flexiforce-integration-guides.

Z. Zhang, "A flexible new technique for camera calibration," Ieee Transactions on Pattern Analysis and Machine Intelligence, vol. 22, No. 11, pp. 1330-1334, Nov. 2000, 2000.

R. Philips. 2016 Sales of U.S. Certified Organic Agricultural Production Up 23 Percent from Previous Year.

\* cited by examiner

SOFT ROBOTIC GRIPPER FOR BERRY HARVESTING

RELATED APPLICATIONS

This application claims priority to U.S. Provisional Application No. 63/113,071, filed on Nov. 12, 2020 and 63/155,075 filed on Mar. 1, 2021, both of which are incorporated herein in their entirety.

STATEMENT REGARDING FEDERALLY SPONSORED RESEARCH & DEVELOPMENT

Not applicable.

INCORPORATION BY REFERENCE OF MATERIAL SUBMITTED ON A COMPACT DISC

Not applicable.

BACKGROUND OF THE INVENTION

According to a USDA report, berries in the US reached a market value of $7.5 billion in 2020. However, as demand increases with market value, the greatest risk to the berry industry is a shortage of human labor. Existing harvesting machines fabricated from rigid components rely on rough handling of the berry by either cutting the stem of the berry and catching the berry in a basket, which leaves an undesirable component from the cane that must still be removed later, shaking the berry, or using hard semi-compliant components to pick the berry, which inevitably damages the fragile berries during the harvesting process, in-turn limiting the potential for the fresh-market berry industry.

Berry harvesting is an arduous, costly endeavor that accounts for up to 50% of the man hours associated with maintaining a berry farm. Current methods are available for automated reaping of robust fruit, such as strawberries, blueberries, pears, etc., but no such options exist for delicate fruit such as blackberries and raspberries.

BRIEF SUMMARY OF THE INVENTION

In one embodiment, the present invention provides unique techniques using soft robotics which is a departure from traditional robotics, which uses a combination of robotics technology and materials chemistry, where soft materials (e.g., silicone or rubber) are used to create a deformable and shape-changing robot resistant to mechanical damage.

In other embodiments, the present invention provides a robotic mobile system developed to effectively harvest fragile berries through an intelligent, novel, soft robotic gripper that has a superior compliancy compared to the traditional rigid machines.

In other embodiments, the present invention provides an autonomous robotic system designed for the grasping and harvesting of delicate cane-ripened berries.

In other embodiments, the present invention provides a system that is autonomous, allowing growers to continue their daily task with no intervention with the robotic system.

In other embodiments, the present invention provides a tendon-driven, soft robotic gripper that is tailor-made for delicate manipulation of berries.

In other embodiments, the present invention provides a system having tendon actuation that reduces daily operation costs by bypassing the need for a large, tethered, power intensive air supply.

In other embodiments, the present invention provides a gripper, used in conjunction with a stiff internal backbone, that ensures delicate manipulation of berries while maintaining rigidity from external forces.

In other embodiments, the present invention provides image processing software developed for the identification and harvesting of berries, such as blackberries, in the primocane and floricane.

In other embodiments, the present invention provides a robotic system used for delicate, on-the-cane, berry harvesting, in this case, blackberries, which can only be cane ripened.

In other embodiments, the present invention provides a gripper element that can be expanded to many different types of berries, such as raspberries, strawberries, or grapes, and also industries that involve handling of delicate, complex components (i.e. with variable cross-section and stiffness, such as pastries or glass lenses, or variable orientation, such as variability in assembly line-based manufacturing).

In other embodiments, the present invention provides a machine vision-based system with novel image processing software used to enable accurate berry location identification and maturity level.

In other embodiments, the present invention provides image processing software and a gripper that incorporates force feedback to optimize gripper harvesting forces, preventing unwanted damage to the berry. This is a major contribution to the field as current automated berry harvesting methods are only suited for robust berries and fruits, such as strawberries, peaches, apples, blueberries, etc. Herein, this invention aims to address those limitations through soft robotics.

In other embodiments, the present invention provides a system used for on-the-cane, fresh-market harvesting, comprising a tendon-driven gripper having fingers made of a compliant material (i.e. rubber or silicone), which prevents unwanted damage to the berries. The gripper may also include an internal backbone made of an elastic material such as a nitinol strip. The strip provides an increase in stiffness in the direction the finger curls for actuation, and stiffens the side-to-side direction stiffness of the finger, which prevents the canes from pushing the finger into an undesired configuration. The fingers of the gripper undergo deflection based on the retraction of a tendon. Each finger also has an internal channel for a tendon.

In other embodiments, the present invention provides a channel that may be reinforced by PTFE tubing to ensure there is no unwanted damage to the compliant material. The channel also provides a low-friction interface between the tendon and the interfacing surface.

In other embodiments, the present invention provides a tendon that is retracted and provides a distributed load across the interior of the silicone body. This load is eccentric to the neutral bending plane (some distance away from the metallic strip), resulting in the inward bending of a finger, permitting the ability to grip an object when three or more fingers are used simultaneously.

In other embodiments, the present invention provides a motor-driven tendon retraction method that allows light maneuverability of the gripper system and low power requirements.

In other embodiments, the present invention provides force sensors attached to the fingertips to provide the force feedback necessary to prevent crushing of the berry.

In other embodiments, the present invention provides force sensors attached strictly to the tendons of fingers.

In other embodiments, the present invention provides for axis-symmetric spacing of the fingers to prevent excessive forces being applied to one specific location on an object such as a berry, which would result in potential skin damage.

In other embodiments, the present invention provides a robotic platform that moves either by tread, or by wheels, down the rows of blackberries. This platform will stop along its path and harvest blackberries by adjusting the 5 to 6 Degrees of Freedom of the gripper (arm angle, height, gripper reach, and horizontal position) through linear actuators attached with respect to the mobile platform.

In other embodiments, the present invention provides a mobile robot platform with autonomous behavior, where the mobile platform will have the characteristic of self-control based on the boundaries and geography of the farm, wherein the platform will possess solar panels or a docking station for charging, reducing maintenance requirements.

In other embodiments, the present invention provides cameras adapted to identify and locate berries with respect to the robot frame, permitting the robot to place the gripper accurately with respect to the berry.

In other embodiments, the present invention provides a rigid protective covering that prevents the fingers from being pulled outward by the canes while the gripper moves towards the berries; once within the vicinity of the berry, the rigid protective covering would open up, pushing the canes away, and the fingers would then reach outward for the berry and grasp it. The grippers would then retract back into the protective covering and deposit the berry into a container.

In other embodiments, each finger is spaced 120° apart around the circumference of the palm and is angled 20° outward from the vertical axis.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

DETAILED DESCRIPTION OF THE INVENTION

Figure 1:
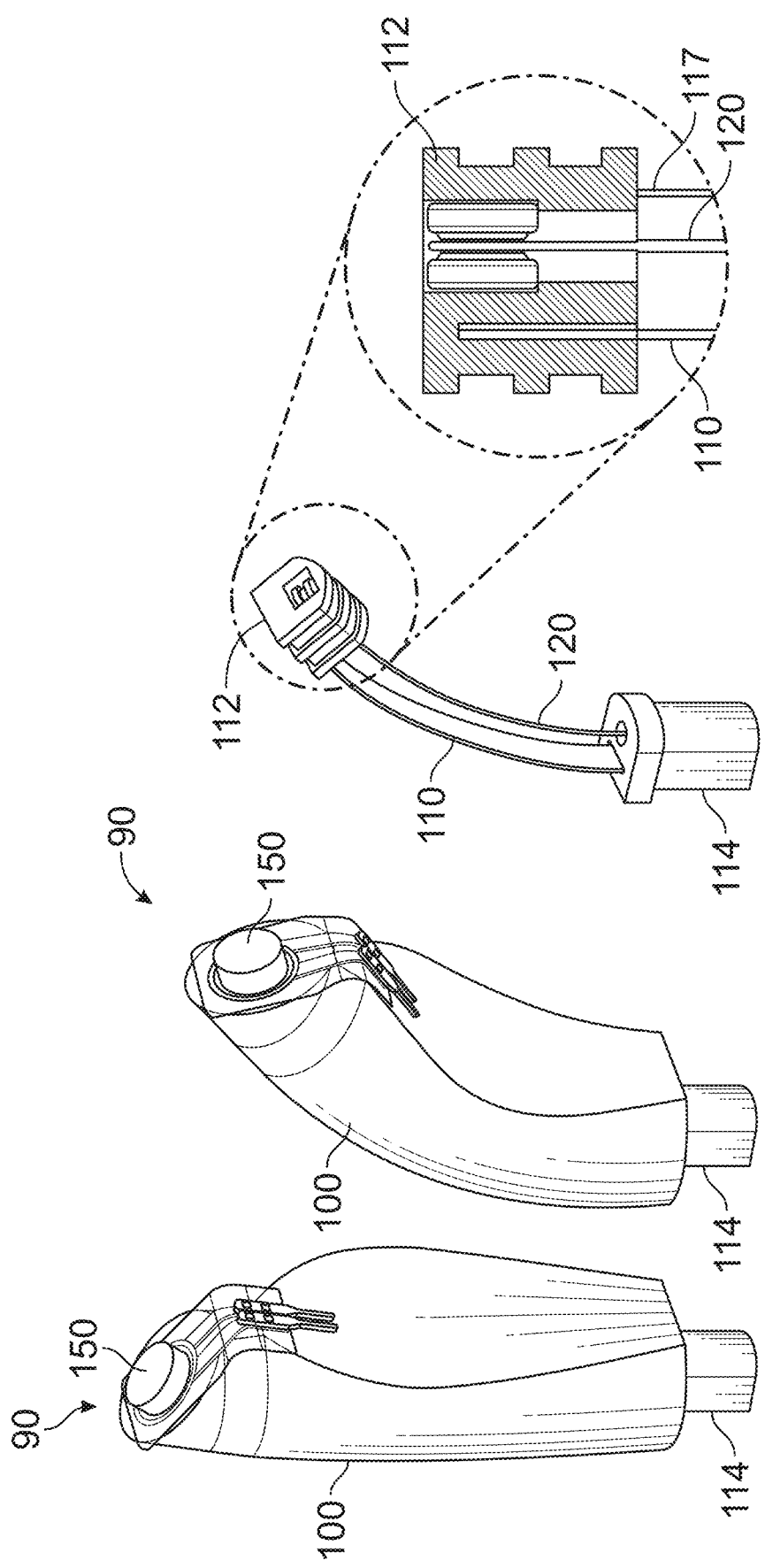
FIG. 1 is a side view of finger in the unforced configuration, a forced configuration caused by tendon retraction, and the same forced configuration without the silicone body to illustrate the internal components.

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure or system. Further, the terms and phrases used herein are not intended to be limiting, but rather to provide an understandable description of the invention.

There is a paradigm shift in robotics that provides significant potential for the industry of harvesting delicate, cane-ripened berries. Soft robotics provides a novel option for robotic harvesting by leveraging the use of soft robotic grippers. This is a departure from the rigid robotic harvesting methods mentioned previously due to the inherent compliance of elastic materials (rubber, silicone, etc.), which enable capabilities and task versatility that are not found in traditional rigid-bodied robotic systems. These soft robotic systems are ideally suited for grasping and manipulating delicate objects with complex shapes.

Several actuation options may be used with the present invention, including pneumatic, hydraulic, tendon drive, vacuum and others.

This present invention leverages soft robotics for the harvesting of cane-ripened berries by utilizing a custom-designed, tendon-driven, soft robotic gripper. The tendon actuation method provided a small cross-sectional footprint that increased dexterity within the primocane and floricane at pick-your-own farms that cannot be accomplished by other actuation methods. The gripper's tendon retraction was actively controlled using force feedback at the fingertips, which allowed harvesting consistency that surpasses the capabilities of the human hand.

Design Requirements

Robotic grippers are generally designed with the goal of optimizing their performance to a specific task. The human hand, however, is well suited for a wide variety of tasks. In this paper, our gripper aims to outperform the human hand with respect to the specific task of caneberry harvesting. By limiting the scope of functions to strictly berry harvesting, the gripper design is limited to only a few constraints. Our gripper aims to overcome the limitations associated with hand harvesting of delicate berries by adhering to these constraints, which include: (1) The gripper must permit soft, accurate handling and manipulation of delicate caneberries. Current berry damage associated with hand harvesting indicates up to an 85% loss of marketable berries to red drupelet reversion. In this preliminary study, it is desired to obtain similar, or less, berry damage percentages compared to that of hand harvesting methods; (2) The actuation method must be able to produce an adequate fingertip force of approximately 0.8 N to consistently pick berries from the cane using closed-loop force control with an ideal harvesting time being less than 5 seconds per berry; (3) The gripper must be able to reliably handle a large range of berry diameters and shapes (~1.5 to 5 cm), ensuring a harvesting reliability of at least 90%. Conversely, the gripper assembly must also have a small cross-sectional footprint to increase dexterity for navigation within the caneberry canopy; (4) The gripper must possess an appropriate amount of finger stiffness to prevent the fingers from being easily disturbed by the surrounding plant canes and leaves; and (5) In order to implement this design as a compact, quiet, autonomous harvester in the future, the gripper assembly must remain untethered.

Finger Design and Fabrication

The embodiments of the present invention may be actuated using the following methods: pneumatic, hydraulic, vacuum, tendon-driven, etc.

Figure 2:
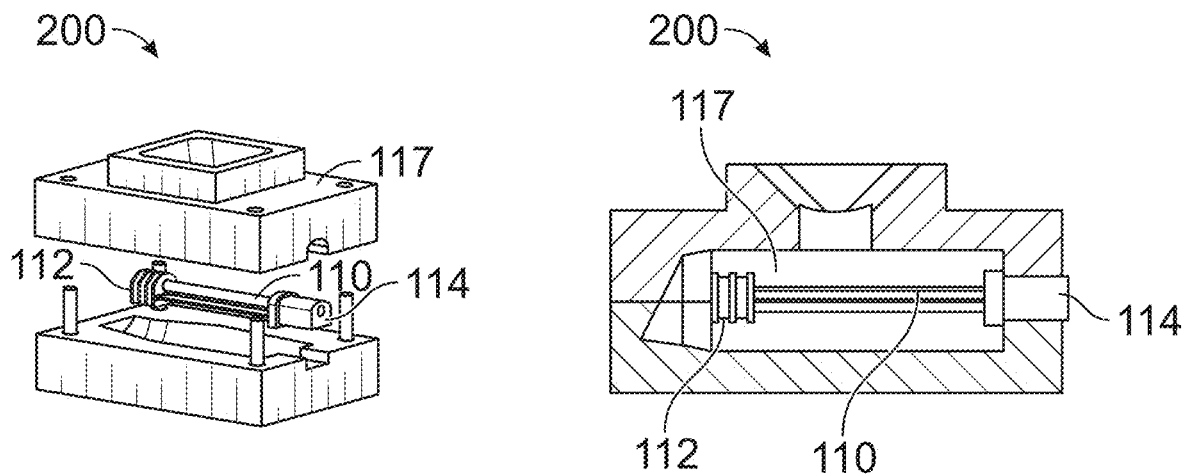
FIG. 2 is the molding process for the finger body with the finger backbone included.

As shown in FIG. 1, a preferred abiding of the present invention provides a finger 90. Finger 90 includes finger body 100 that may be created using a two-part silicone mold 200 as shown in FIG. 2, which permitted a soft interface for handling the berry. However, because finger 90 may be passive by being made of a compliant material such as silicone, this property also leaves the fingers susceptible to external disturbance. To offset this drawback and meet design requirement 4, a 5 mm wide, 0.3 mm thick nitinol strip was used as an internal backbone 110, as shown in FIG. 1. Strip or backbone 110 produces mildly increased stiffness in the direction of desired curvature, requiring a maximum tendon actuation force of only 20 N, but provides 278× greater stiffness in the transverse direction.

Molding of the finger 90 may be accomplished using a two-part mold 200 that may be made of ABS plastic using additive manufacturing. This process began with the assembly of the internal structure. The nitinol backbone 110 is adhered to a plastic tip 112 and base 114 using cyanoacrylate, as shown in FIG. 1. PTFE tubing 117 was also attached to the plastic tip and base to create a cavity within the silicone mold for tendon 120. Tendon 120, which was also included during the molding process, may be a guitar string (36-gauge, Ernie Ball, Calif. USA) that was terminated in the upper plastic component with a 3 mm offset from the nitinol strip. This offset was used to provide eccentric loading during tendon retraction, resulting in inward bending of finger 90. Once finger and backbone are assembled, the assembly was clamped between the lower and upper mold. The clamping force held the backbone assembly in place, while the nitinol strip provided the rigidity necessary to ensure the plastic tip was level with the plastic base. The silicone was poured through the opening in the upper mold. After the silicone cured (~40 min.), the finger was removed, and the excess silicone was severed from the finger body with a blade. The molding process can be seen in FIG. 2.

Force Sensor Integration

Figure 3:
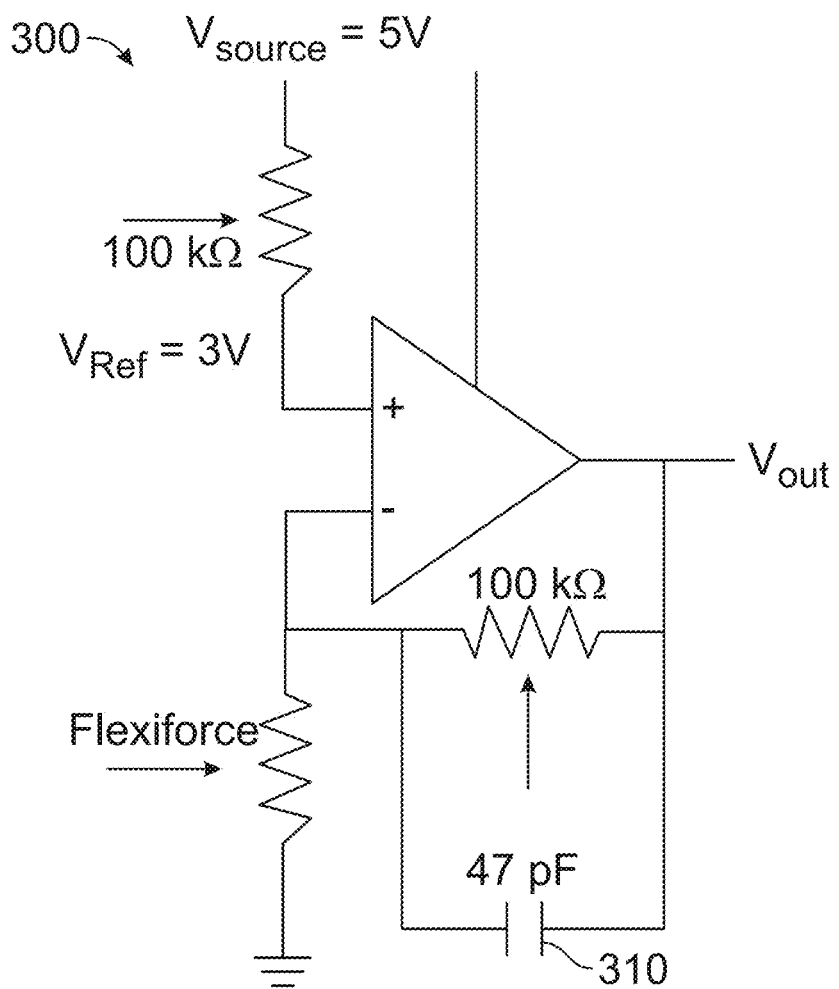
FIG. 3 is a circuit diagram that may be used with the present invention. An exploded view of a curing assembly for embodiment of the present invention.

As shown in FIG. 1, flexible sensor 150 may be used to relate task space force to joint space control in the present invention. Flexible sensor 150 may be a flexible resistive or capacitive sensor positioned at the location that the force will be applied. Force feedback may be achieved by adhering force sensor 150, which may be a FlexiForce resistive, to each fingertip using cyanoacrylate. This sensor may be paired with a single power source non-inverting op-amp circuit using an MCP6004-I/P operational amplifier, as shown in FIG. 3. This circuit design was used due to its ability to (i) increase sensitivity with signal amplification, and (ii) provide a linear relationship between force and voltage, which is accomplished by the variable conductance of the FlexiForce sensor. A 100 kΩ potentiometer 300 was used as a feedback resistor to further increase the sensitivity. To increase stability, a 47-pF capacitor 310 was included in parallel to the feedback resistor. The supply voltage was 5V, and the reference voltage to the positive terminal of the amplifier was set to 3V using another 100 kΩ potentiometer.

The linear relationship between voltage and force was established using a simple calibration method based on a two-point linear relationship provided by: (i) a reference voltage of 3V with no applied force, and (ii) a voltage equal to 90% of the saturation voltage (5V) of the operational amplifier at 120% of the expected maximum applied force (3.9 N). The latter relationship was selected to provide the highest sensitivity without risk of saturation. Using this relationship, a desired force threshold for handling the berry can be related to a measured voltage.

Per the mechanical integration recommendation of Tekscan, a thin-cylindrical support (9.50 mm OD, 2.54 mm thick) was additively manufactured out of PLA and adhered to the sensing area of each FlexiForce sensor with double-sided tape. This support was used to ensure the force was entirely transmitted to the sensing area of the sensor as opposed to any other location on the finger body. The sensors were placed on the fingers such that the center of each sensor would achieve contact that was approximately normal to the berry's surface during finger actuation.

Finger Configuration

Figure 4:
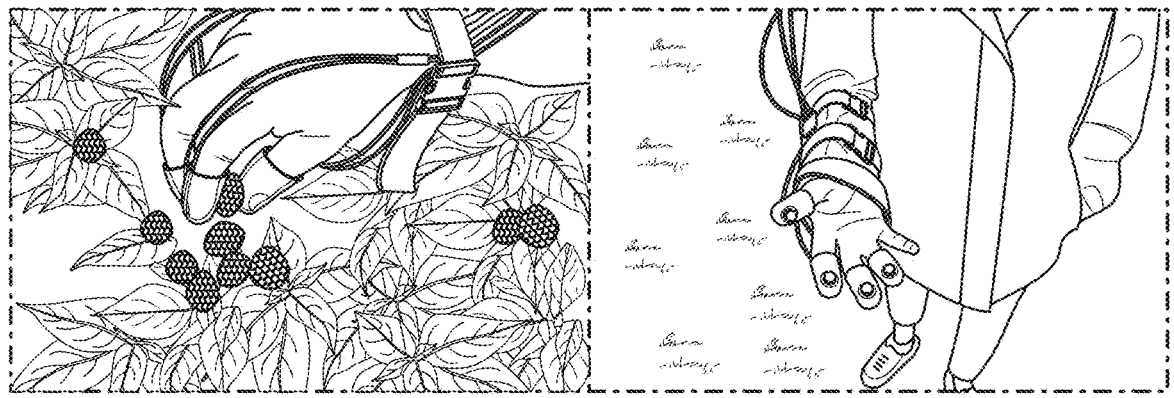
FIG. 4 is the force-sensing apparatus for manual blackberry harvesting with sensors oriented to maximize contact with the berry surface during harvesting.

An important aspect of gripper design is the optimization of finger quantity, as well as their configuration on the palm. Optimization began with a qualitative investigation of the harvesting technique of skilled laborers through visual validation. It was found that laborers with smaller hands typically use four fingers to harvest blackberries, while harvesters with larger hands typically use only three fingers. Consequently, quantitative analysis was conducted to determine if the fourth finger of a laborer with smaller hands applied a negligible force. A custom-made force sensing system was developed to detect the forces applied by the fingertips of an experienced laborer using the FlexiForce A301 resistive force sensor for each finger, as shown in FIG. 4. These sensors used the aforementioned circuit shown in FIG. 3. Voltage data was measured using an Arduino Uno and sent through Bluetooth to MATLAB. In MATLAB, the voltage was converted to a force value based on the linear relationship and the force data was recorded into an Excel spreadsheet. A total of 2,160 blackberries were harvested using this system to determine the average force applied by each finger during the manual harvesting process. These results can be seen in Table 1.

TABLE 1

Average Forces per Finger for Manual Harvesting Blackberries

| Finger | Thumb | Index | Middle | Ring |
|---|---|---|---|---|
| Force [N] | 0.782 | 0.191 | 0.397 | 0.065 |

Table 1 indicates the need for three fingers and experimentally suggests that the fourth finger's applied load is negligible. It should be noted that the thumb had the highest average force of 0.782 N, followed by the middle finger with a value of 0.397 N. This can be explained by the anatomical opposition of the thumb to that of the middle finger when gripping small objects. Considering that a common mode of blackberry damage is drupelet deflation, in a preferred embodiment, the present invention uses axis-symmetric spacing of the fingers as an optimum configuration to ensure an equal distribution of force is applied by each finger to the berry's surface.

Soft Gripper Assembly

Figure 5:
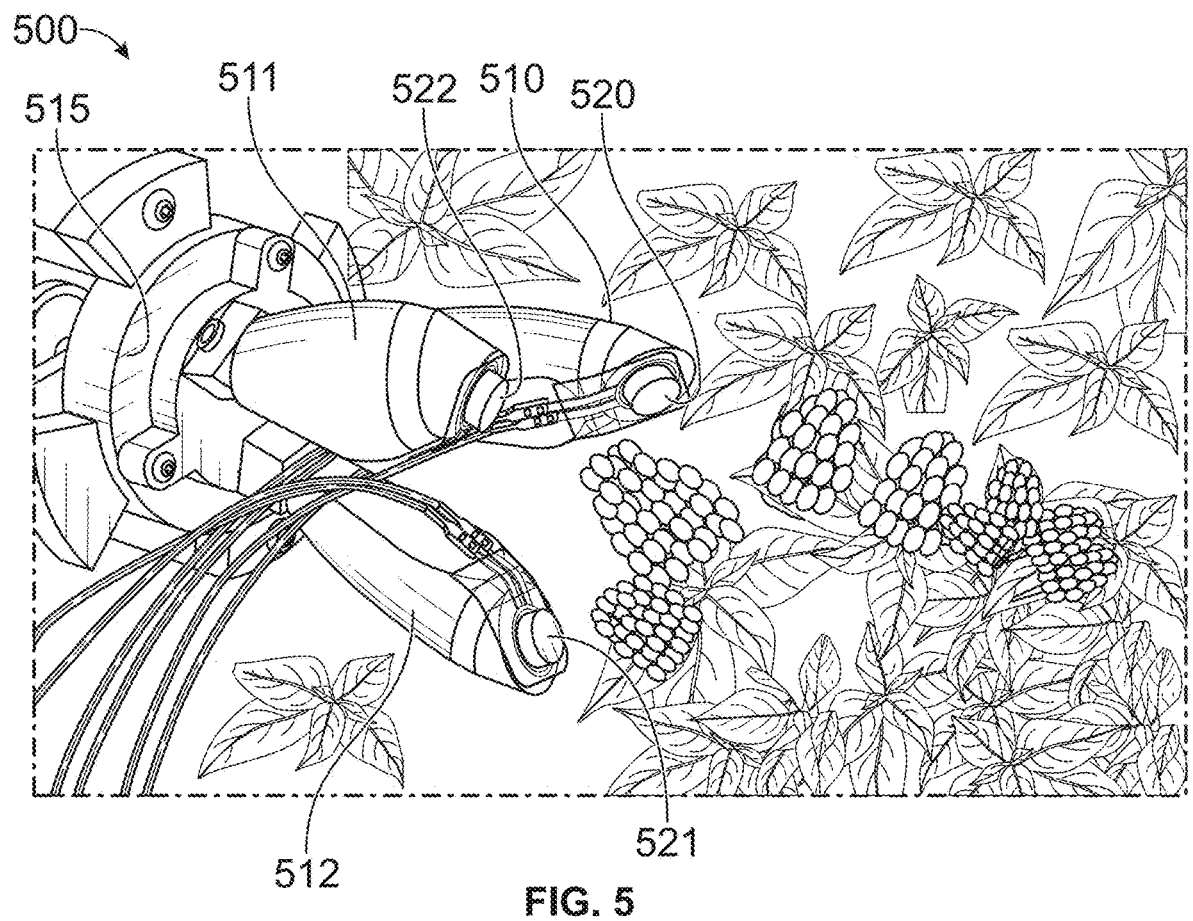
FIG. 5 shows the gripper in an unforced configuration prior to harvesting a ripe blackberry featuring a wide initial opening angle and the straightness of each finger.
Figure 6:
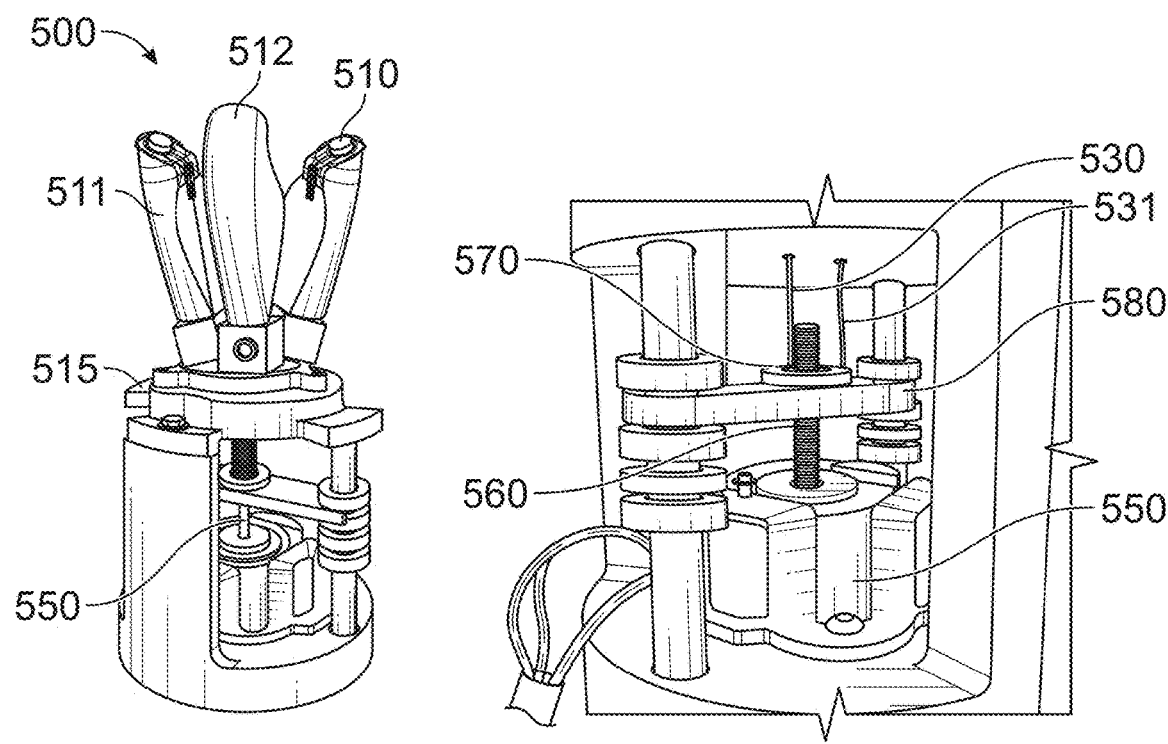
FIG. 6 shows a tendon-actuated gripper assembly.

In one embodiment of the present invention, as shown in FIGS. 5 and 6, gripping system 500 include a plurality of fingers 510-512 which may be 6.45 cm long and spaced 120° around and attached to the circumference of palm or base 515. The fingers may also be offset by an angle of 20° from the vertical axis so that a maximum gripping diameter of 5.5 cm was provided between force sensors 520-522, which accommodated the largest blackberry size and ensured that the outsides of the fingertips were within the mounting base profile.

As shown in FIGS. 5 and 6, finger 510-512 are actuated using tendons 530 and 531 attached to stepper motor 550 (17HS08-1004S, StepperOnline). The stepper motor shaft may be lead screw 560, which is secured with structural epoxy to the rotor. Rotational motion of the stepper motor is converted to linear translation through the press-fit of lead screw nut 570 into an additively manufactured linear bracket 580 as shown in FIG. 6. The linear bracket extended radially to two linear rails and was affixed by means of a snap-fit to two linear bearings, which provided low-friction translation and constrained the linear bracket to strictly translational motion. Each tendon is connected to linear bracket 580. In a preferred embodiment, each tendon is pre-tensioned and terminates below the linear bracket via knots located at the end of the tendons.

Control System

A force feedback system may be implemented in an Arduino Mega 2560 using a PD controller, which adjusted the stepper motor's rotational speed, thereby controlling tendon retraction speed. The desired speed was determined by first comparing the measured voltages from each of the fingers. The maximum measured voltage was then compared to a voltage corresponding to a maximum allowed force using the linear relationship between voltage and force. The resulting error and its differential determined the linear retraction speed. This operation was conducted using a global timer interrupt which directly reads from, and writes to, the Arduino Mega 2560's Timer 1 register to run the stepping function exactly 10,000 times per second, while simultaneously taking input from the force sensors and outputting the desired speed using the PD controller. A proportional gain of 4000 and derivative gain of 125 were used. No integral gain was used to prevent potential overshoot. To manage the system's programmatic edge cases, the stepper motor turns itself off at the ends of its desired travel, as well as when the error is within the desired tolerance; as a result, the non-back-drivable lead screw prevents linear retraction from occurring through static friction. This feature acts to minimize the energy usage of the gripper, while also preventing damage to the gripper and to the berries, increasing the robustness of the system.

Force Control Reliability

Figure 7:
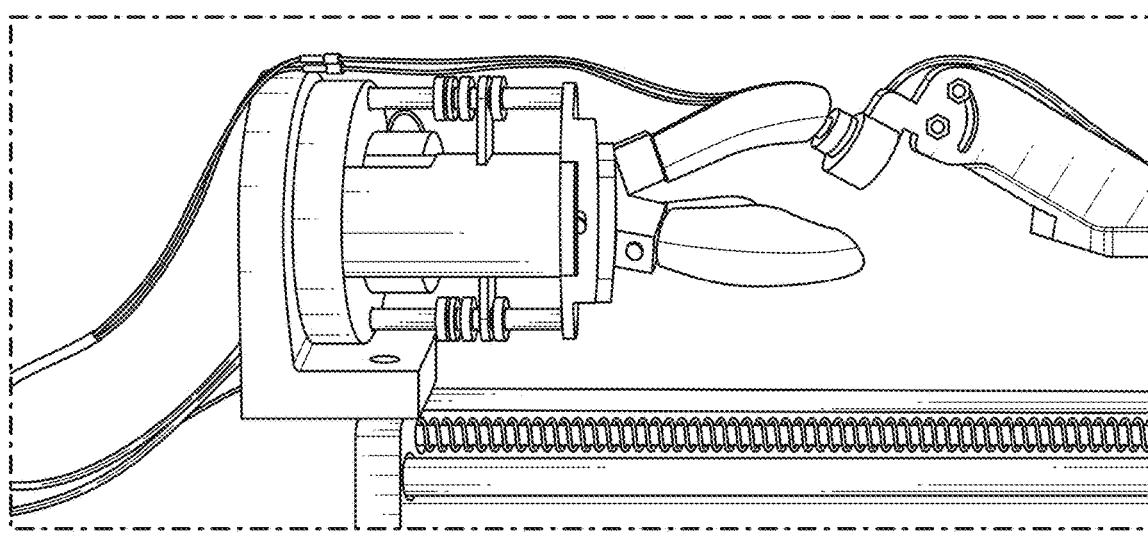
FIG. 7 shows an experimental setup to test the consistency of the PD controller where the ATI force sensor was constrained such that it was approximately parallel to the FlexiForce sensor after finger retraction.

Berry damage is primarily caused by excessive handling of loads through hand harvesting. Therefore, in the force control reliability test, the aim was to evaluate the PD controller efficacy. The gripper was tested at several desired fingertip forces by allowing the PD controller to retract the finger tendons until the FlexiForce sensor reached a threshold voltage that was related to the desired force. The voltage change was caused by the contact of the FlexiForce sensor with a high-resolution ATI force sensor (P/N: 9230-05-1311, ATI). The ATI sensor was constrained to a linear table and was positioned and oriented such that it was approximately parallel to the finger's force sensor in the finger's curled configuration, as shown in FIG. 7. The force control reliability test was conducted for eleven different desired force values ranging from 0.491 N to 1.472 N. This test was repeated eleven times for each respective force value, resulting in a total of 121 data points.

Finger Actuation Characterization

Figure 8:
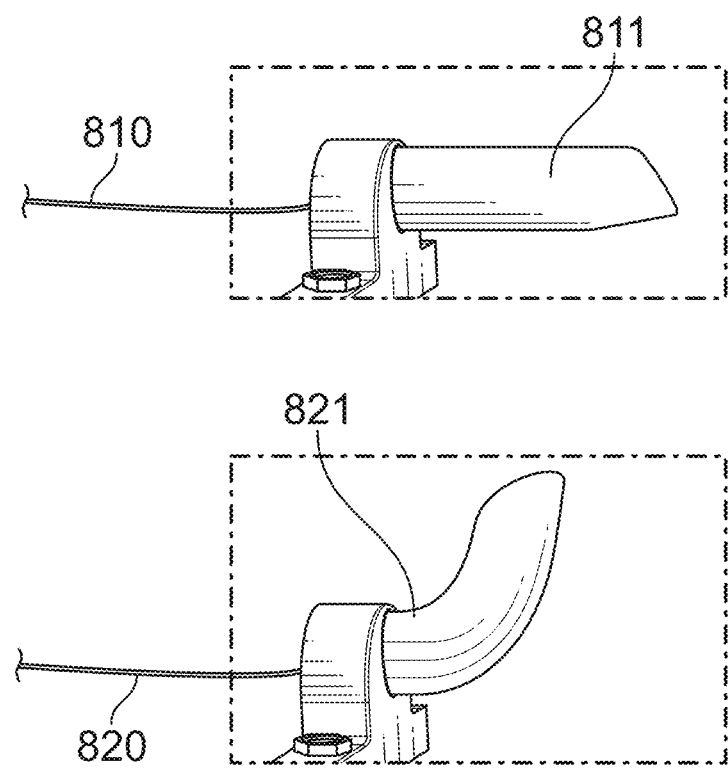
FIG. 8 shows how the finger can be seen in a (A) 0 mm tendon retracted configuration and (B) 10 mm tendon retracted configuration.

The joint space (tendon retraction) was related to the task space (finger shape) by constructing an experimental setup that synchronously measured force and tendon retraction as the tendon was retracted. This was achieved using a linear sliding table that utilized an SFU1605 ball screw driven by a NEMA 23 stepper motor. The tendon wire was attached to a force sensor (Go Direct® Force and Acceleration Sensor, Vernier), which was constrained to the linear table. The finger assembly was fixed to the end of the linear rail using an additively manufactured bracket. A camera (5WH00002, Microsoft LifeCam Web Camera) was placed perpendicular to the longitudinal axis of the finger to record the resulting finger shape, as shown in FIG. 8. The camera was calibrated using the MATLAB Camera Calibration Toolbox. The tendon was retracted from 0 to 10 mm in 0.50 mm increments. At each increment, the force measured from the Vernier force sensor was recorded in conjunction with an image of the finger being captured. As shown in FIG. 8, when tendon 810 of finger 811 is not under tension or pulled in a direction away from the fingertip, finger 811 is in a relatively straight position. As also shown, when tendon 820 of finger 821 is under tension or pulled in a direction away from the fingertip, finger 821 transitions from a straight position to a curled position.

Grasping Force (Max Holding Weight)

Figure 9:
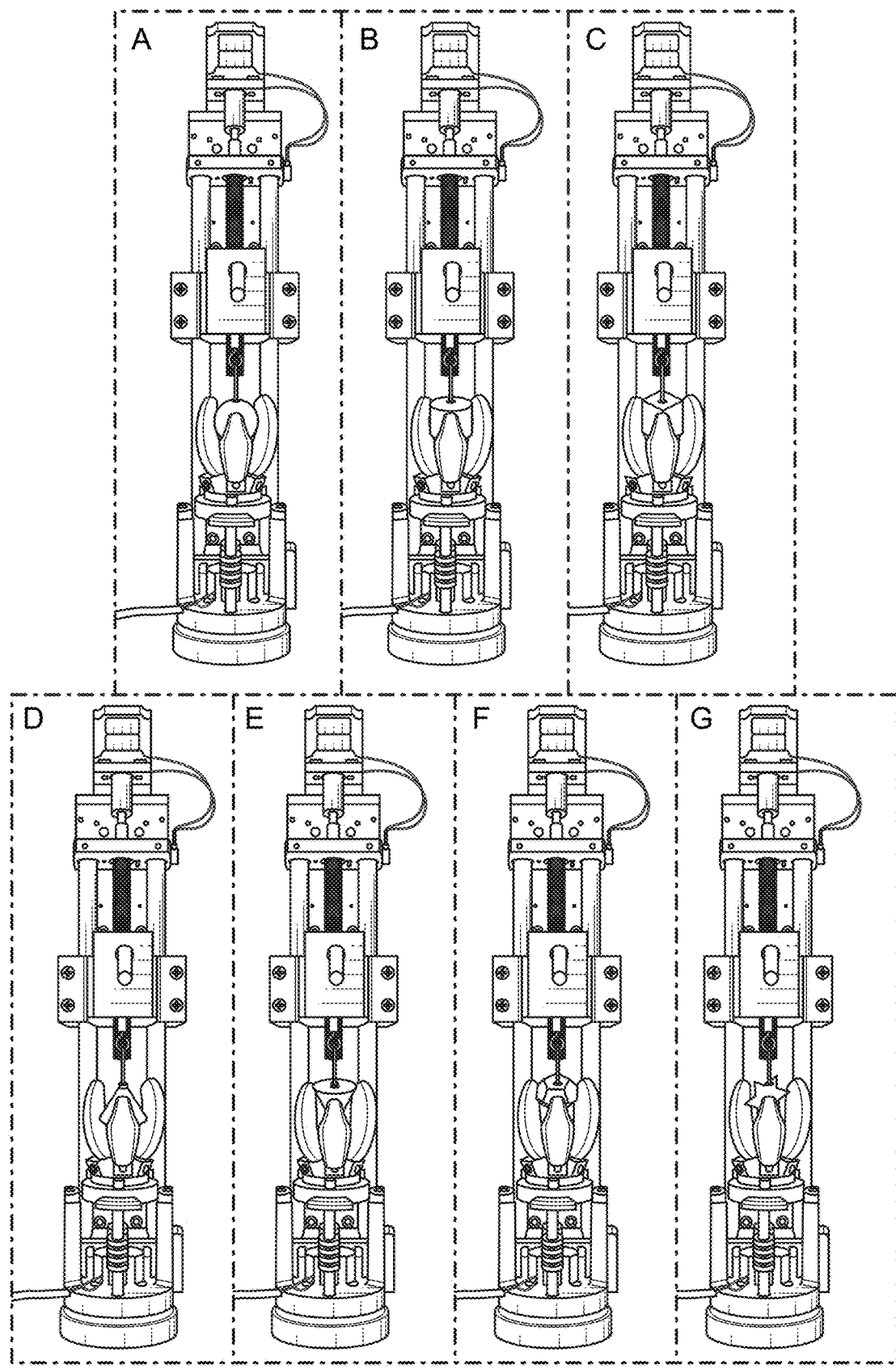
FIG. 9 shows various geometric shapes used to test the gripping retention force, including a sphere, cylinder, cube, upright cone, inverted cone, icosahedron, and stellated dodecahedron, labeled respectively from A to G. All objects had major dimensions (diameter, height, length) of 3.81 cm, with the exception of the cube, which had a side length of 2.54 cm.
Figure 10:
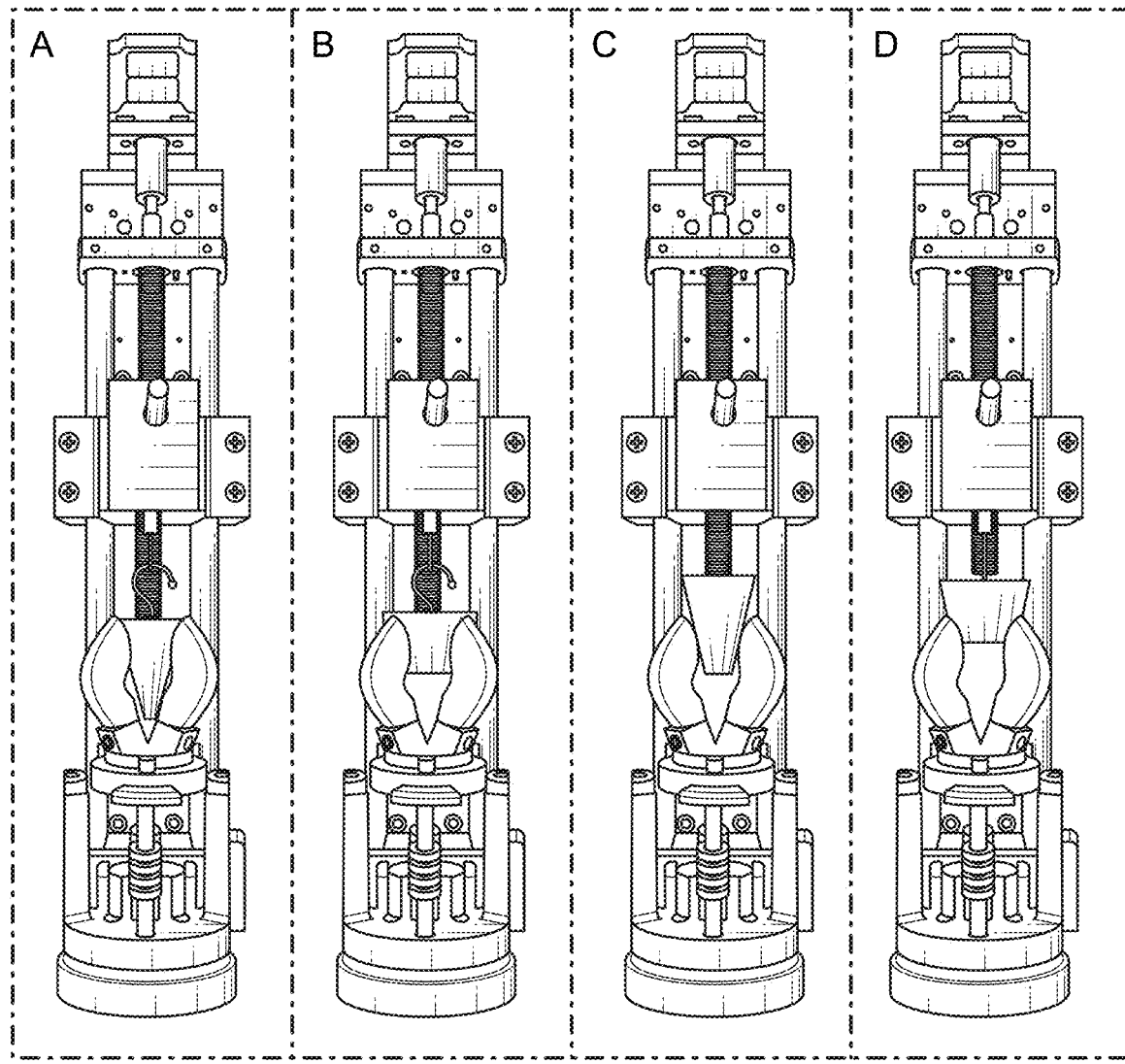
FIG. 10 shows an experimental setup for the pulling (A, B) and pushing (C, D) portions of the fingertip force characterization test.

The grasping force test related the retention force provided by the gripper in response to various geometric objects as they were pulled away at a constant speed. Several geometric solids were 3D printed and arranged in seven configurations as shown in FIG. 9. Hooks were screwed into each of the geometric solids, permitting attachment to the force sensor (Go Direct® Force and Acceleration Sensor, Vernier). The force sensor was affixed to the linear table, and the gripper assembly was rigidly affixed to the end of the linear rail. The linear rail was oriented vertically and the force sensor was zeroed while holding each respective 3D-printed geometric shape to account for the weight of the object. The linear table was moved downward until the top of the shape was below the inner edge of the fingertips. The tendons of the fingers were then retracted until the fingers were coincident with the surface of the shape. The tendons of the gripper were then retracted by an additional 4 millimeters to apply a grasping force to the surface of each shape. The retention force was recorded while the linear table was linearly translated away from the gripper at a rate of 1 mm/s until the object was no longer constrained by the gripper. A similar procedure was repeated for only the 3D printed sphere and cylinder at tendon retractions ranging from 1 to 7 mm.

Fingertip Force Characterization

The normal force applied by the gripper to objects of various diameter was characterized by constructing an experimental setup that measured the force needed to push and pull a 3D printed cone with a 15° draft angle between the gripper's fingers at a constant velocity. A cone was chosen because it enabled a continuous and axis-symmetric method of measuring a range of object diameters, where the object diameter grasped by the gripper is a function of linear translation. The 3D printed cone was split into two truncated pieces to allow a greater range of gripping diameters. The experimental setup consisted of using the aforementioned linear rail assembly. A force sensor (Go Direct® Force and Acceleration Sensor, Vernier) was affixed to the linear table via a metal rod, and the gripper assembly was rigidly affixed to the end of the linear rail.

For measuring the pulling force, hooks were screwed into the truncated cones which allowed attachment to the force sensor. To eliminate the influence of gravity on the pulling force, the linear rail was oriented vertically, and the force sensor was zeroed while supporting each truncated cone to account for object weight. The linear table was translated downward until the base of each cone was below the inner edge of the fingertips. The tendons of the fingers were then retracted to test tendon retraction. The diameter at the base of the fingertip was marked as the initial diameter. The linear table was pulled away from the gripper at a speed of 1 mm/s until the gripper was no longer in contact with the object. The force sensor output was recorded during the entirety of the object's translation.

For measuring the pushing force, the hooks were removed from the truncated cones, and each part was placed in the closed gripper at the tendon retraction to be tested. The diameter at the base of the fingertip was marked as the initial diameter. The truncated cones were then pushed into the fingers of the gripper via the linear rail at a speed of 1 mm/s, and the insertion force was measured with the force sensor.

Similar pushing and pulling procedures were repeated for both truncated cones at tendon retractions ranging from 5 to 9 mm in 0.5 mm increments. Because the measured force and the position of the cone are related to time, the cross-sectional diameter of the cone can be related to the measured force based on the draft angle of the cone and its position with respect to the gripper.

Grasping Versatility

Although the gripper was designed specifically for berry harvesting, it has potential to be used to handle objects of activities of daily living (ADL). As a result, gripper versatility was tested on a wide variety of object sizes, geometries, and material properties. This included a variety of fruits and vegetables, glass and plastic bottles, and other rigid and non-rigid objects. This was done by simply placing the object to be tested within the gripper's workspace and retracting the tendons of the gripper until an adequate amount of force was applied to prevent the object from falling by being securely gripped by the system.

Field Test (Harvest Reliability, Speed, and Damage)

The final test of the gripper's efficacy was an intensive field test that involved harvesting a total of 240 blackberries. The gripper was manually positioned and oriented and the berry was harvested once it was within the workspace of the gripper. Three different desired fingertip force thresholds were used. Sixty berries were harvested at a desired fingertip force value of 0.59 N, 0.69 N, and 0.78 N, respectively. Additionally, sixty blackberries were also harvested with the force sensors removed, using a tendon retraction of 4 mm; although this provided no force feedback, it removed the rigid cylindrical support from the fingertip, resulting in exclusively soft, compliant contact with the berries. The blackberries for this evaluation had a mass of roughly 8 g each with a length of 30 mm and a width of 21 mm. For each tip force level, the blackberries were harvested and placed in plastic, vented clamshell containers (20 berries per clamshell), then stored at 2° C. for 21 days to evaluate RDR.

Force Control Reliability

Figure 11:
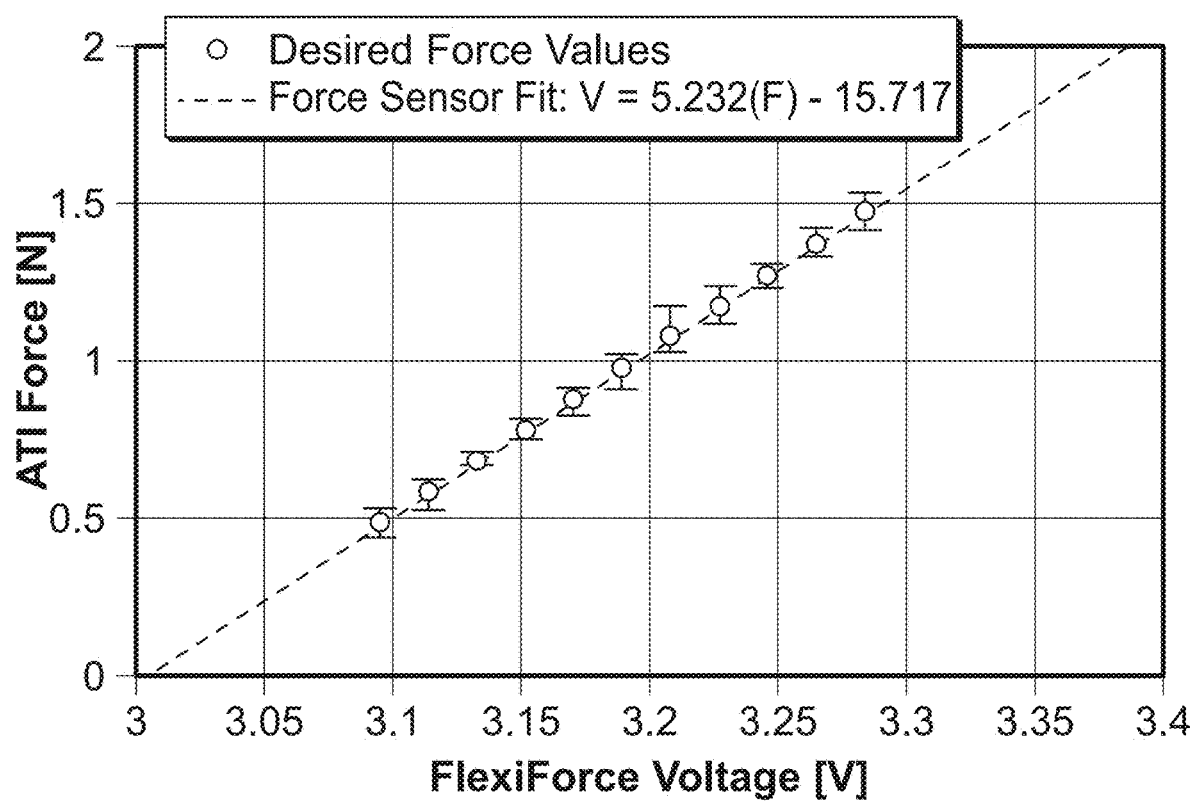
FIG. 11 graphically depicts the comparison of the force sensor attached to the finger to a high resolution ATI force, indicating finger force sensor accuracy. The desired force values (dots) are overlaid on the linear calibration line from with error bars representing the experimentally measured results.

Using the calibration method described above, the linear relationship provided by the circuit indicated a slope of $$5.232 \frac{V}{N}$$

with a center trim variable of −15.717 V. Using this relationship, a desired threshold voltage was set for the controller based on the desired force values. For each desired force value, the force from the ATI force sensor was recorded for the 11 trials. This force was converted to voltage using the calibrated linear regression. A plot of the calibrated linear regression (hyphenated line) and the resulting force values (error bars) of the experimental results can be seen in FIG. 11. Due to the novelty of robotic blackberry harvesting, there remain many unknown design constraints, such as the required force accuracy to prevent berry damage; however, the average error between the desired force and the applied force to the ATI force sensor was 0.046 N, indicating high controller reliability.

Finger Actuation Characterization

Figure 12A:
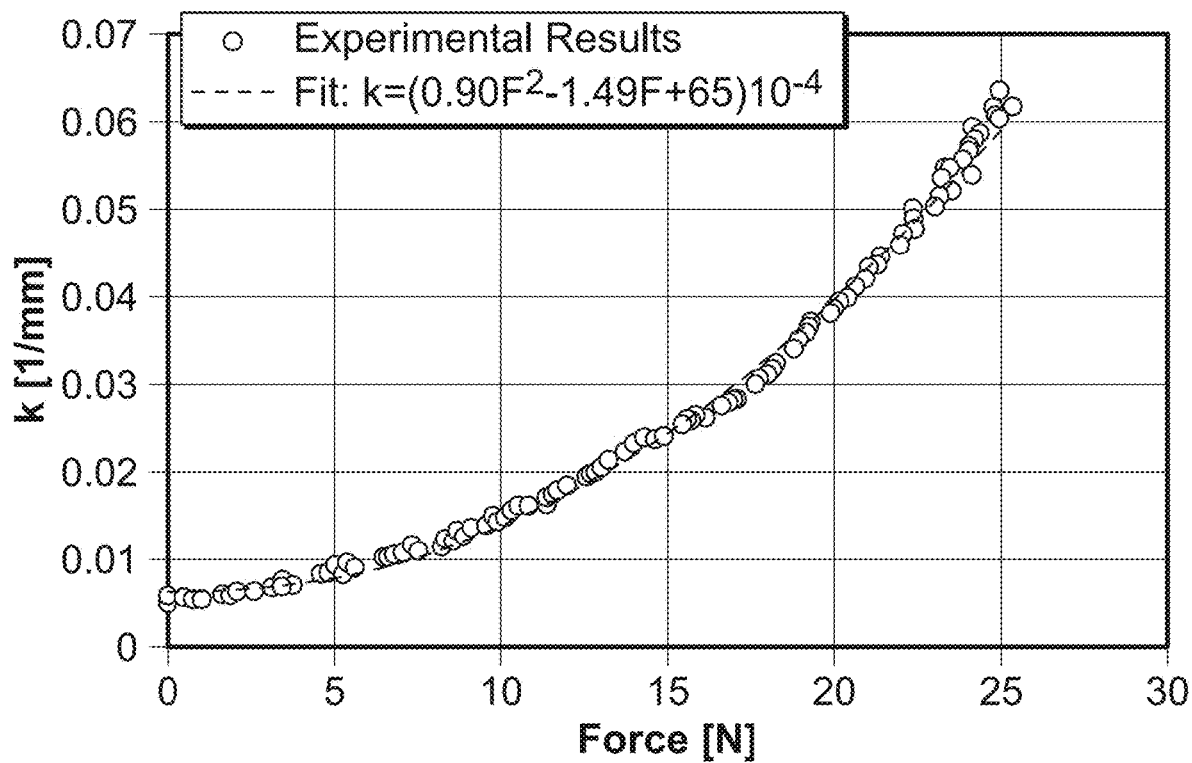
FIG. 12A shows the relationship between tendon force and the resulting curvature of the inner face of the finger.
Figure 12B:
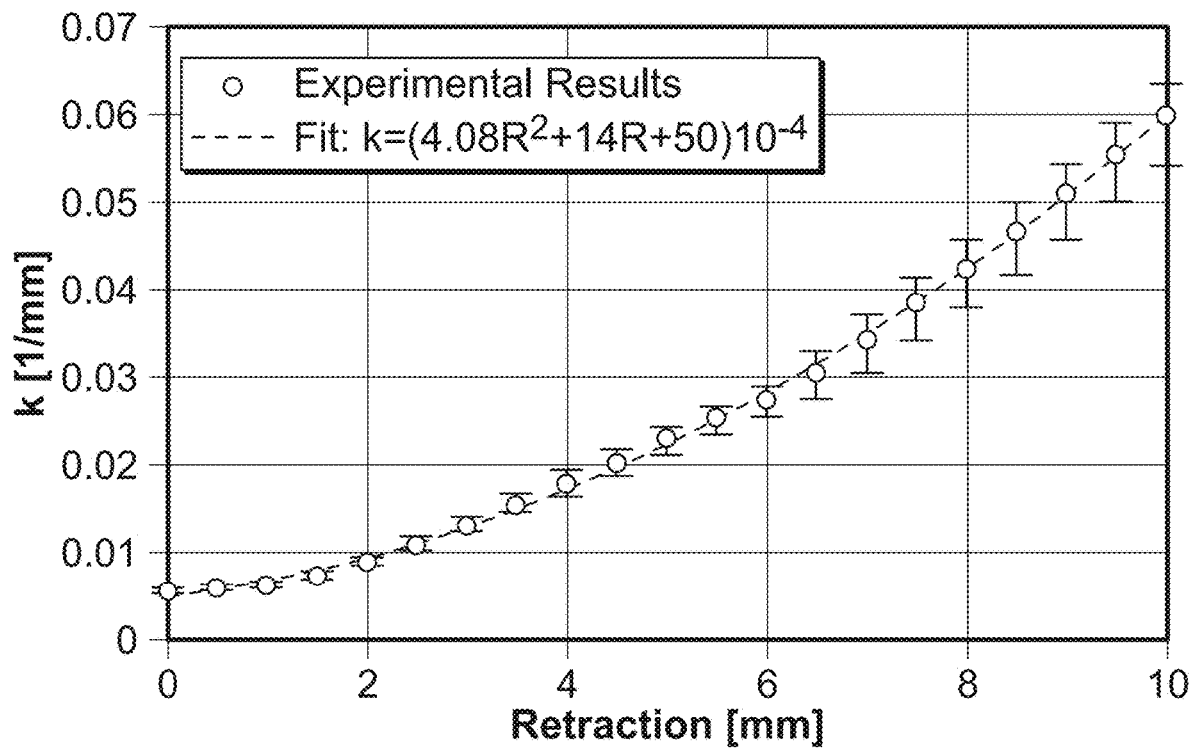
FIG. 12B shows the relationship between the tendon retraction and the resulting curvature.

For each tendon retraction, image processing was used to fit a circle to the inner surface of the finger, and the curvature associated with each configuration of the finger was calculated and recorded. FIG. 12 depicts the curvature with respect to each force (A) and tendon retraction (B). A quadratic curve was fit to each data set to provide a relationship between the independent variables to the curvature for the procedures in the following experiments. FIG. 12A depicts every recorded data point, with an average error between the experimental curvature and the curve-fitted curvature of 5.03%. FIG. 12B depicts the relationship between tendon retraction and the resulting average curvature, with an average percent error between the experimental curvature and the curve fitted curvature of 5.50%.

Gripping Force (Max Holding Weight)

Figure 13:
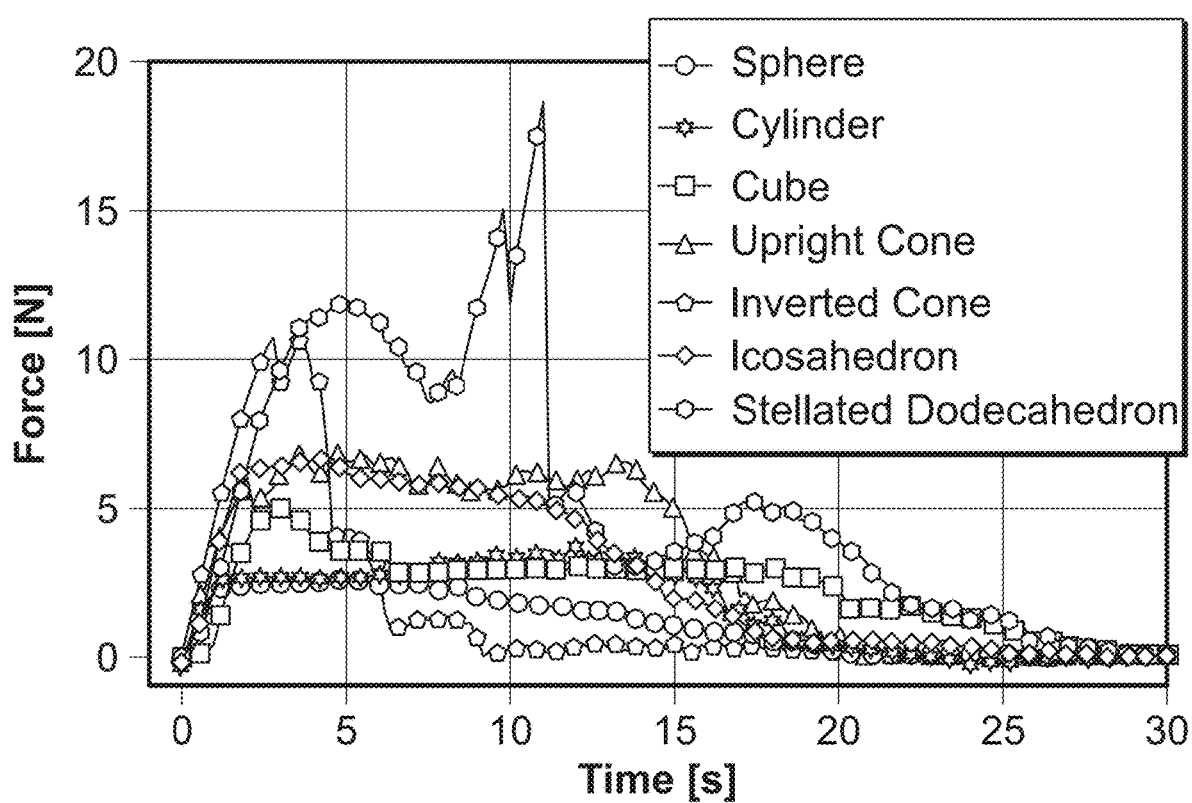
FIG. 13 depicts results from the gripper retention force test for each of the seven characteristic objects at a tendon retraction of 4 mm. The maximum retention force provided by the gripper was 2.75 N for the sphere, 3.72 N for the cylinder, 4.96 N for the cube, 6.84 N for the upright cone, 10.84 N for the inverted cone, 6.65 N for the icosahedron, and 18.94 N for the stellated dodecahedron.
Figure 14A:
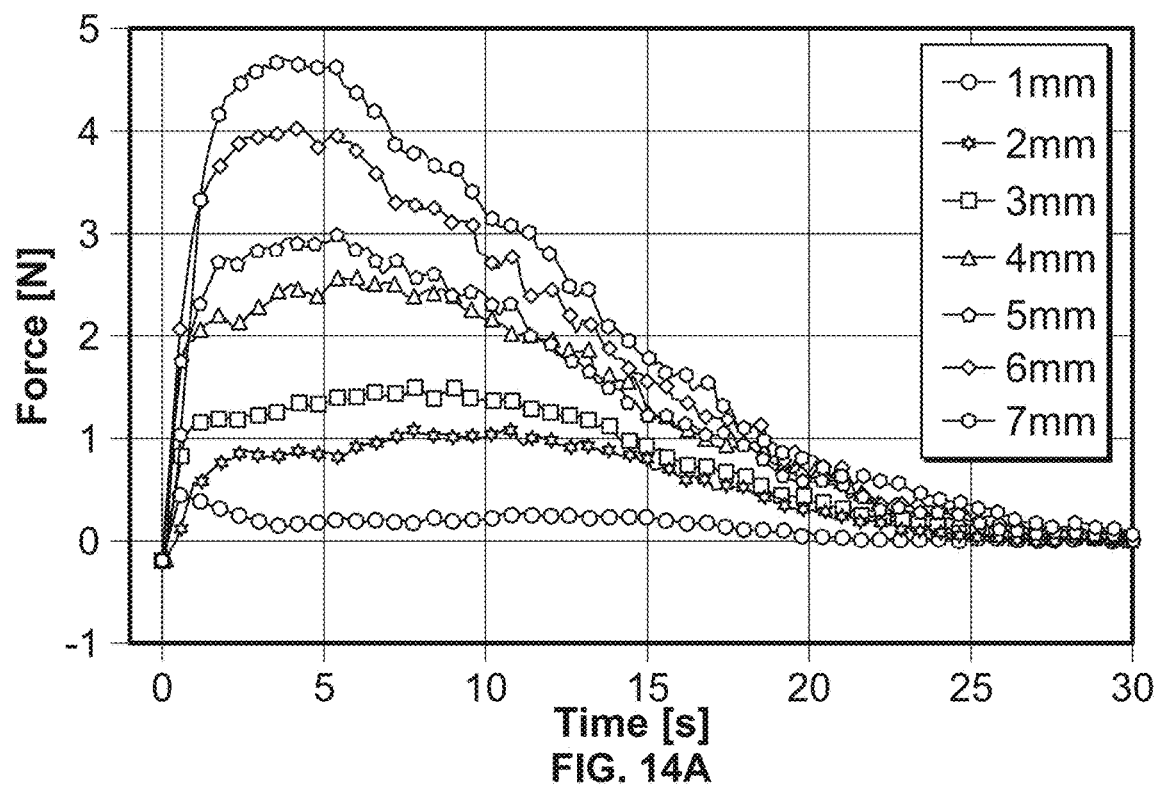
FIGS. 14A and 14B depict the results from the gripper retention force test for tendon retraction lengths of 1-7 mm when gripping the sphere (top image) and cylinder (bottom image). The maximum retention force provided by the gripper was 4.71 N for the sphere and 3.50 N for the cylinder.
Figure 14B:
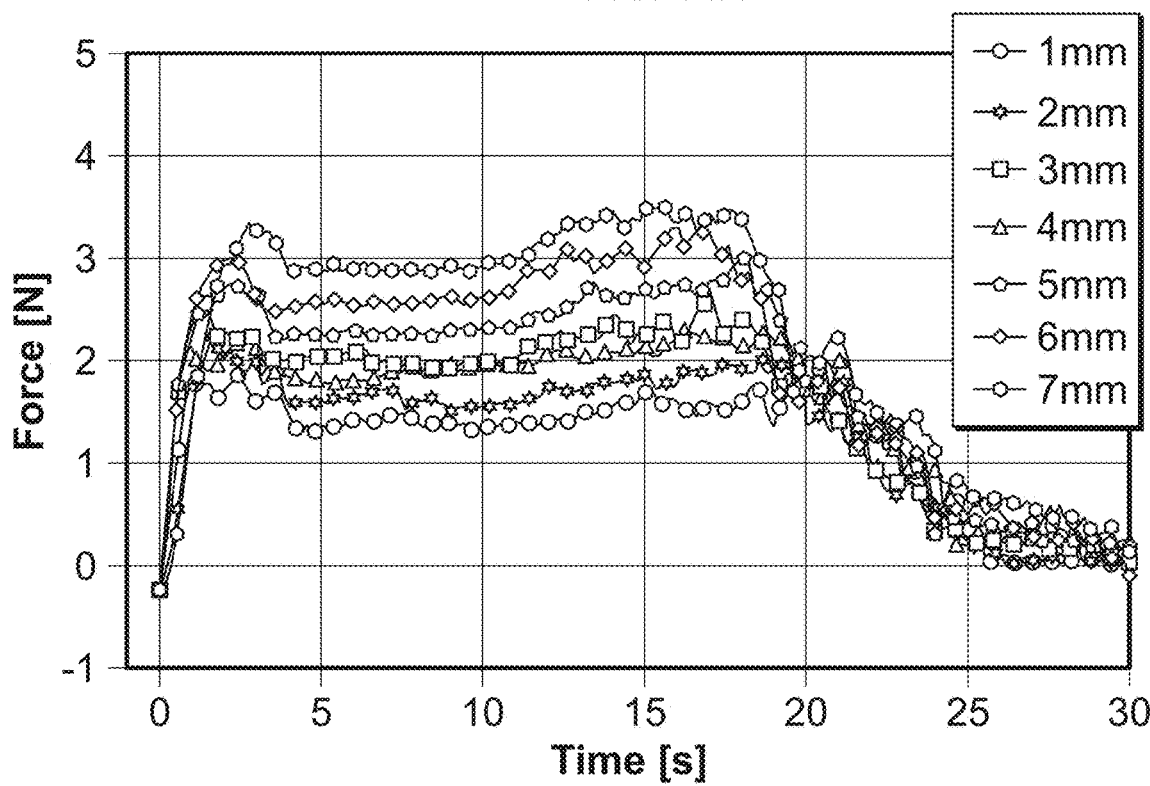

The overall maximum force sustained by the gripper was 18.94 N, which was accomplished with the stellated dodecahedron, as shown in FIG. 12. This shows that the gripper is capable of handling a payload of nearly 2 kg. It is interesting to note that objects possessing sharp edges (stellated dodecahedron, cone) were retained at higher loads than objects with smooth features (cylinder, sphere). This is clearly captured by the measured retention force of the sphere and cylinder at a tendon retraction of 4 mm as shown in FIG. 13. It was found that at 4 mm, the gripper can handle a 0.28 kg payload for a 3.81 cm diameter spherical object and a 0.38 kg payload for a 3.81 cm diameter cylindrical object, both of which are less than 20% of the payload of the stellated dodecahedron at 4 mm tendon retraction (1.93 kg).

Fingertip Force Characterization

Figure 15:
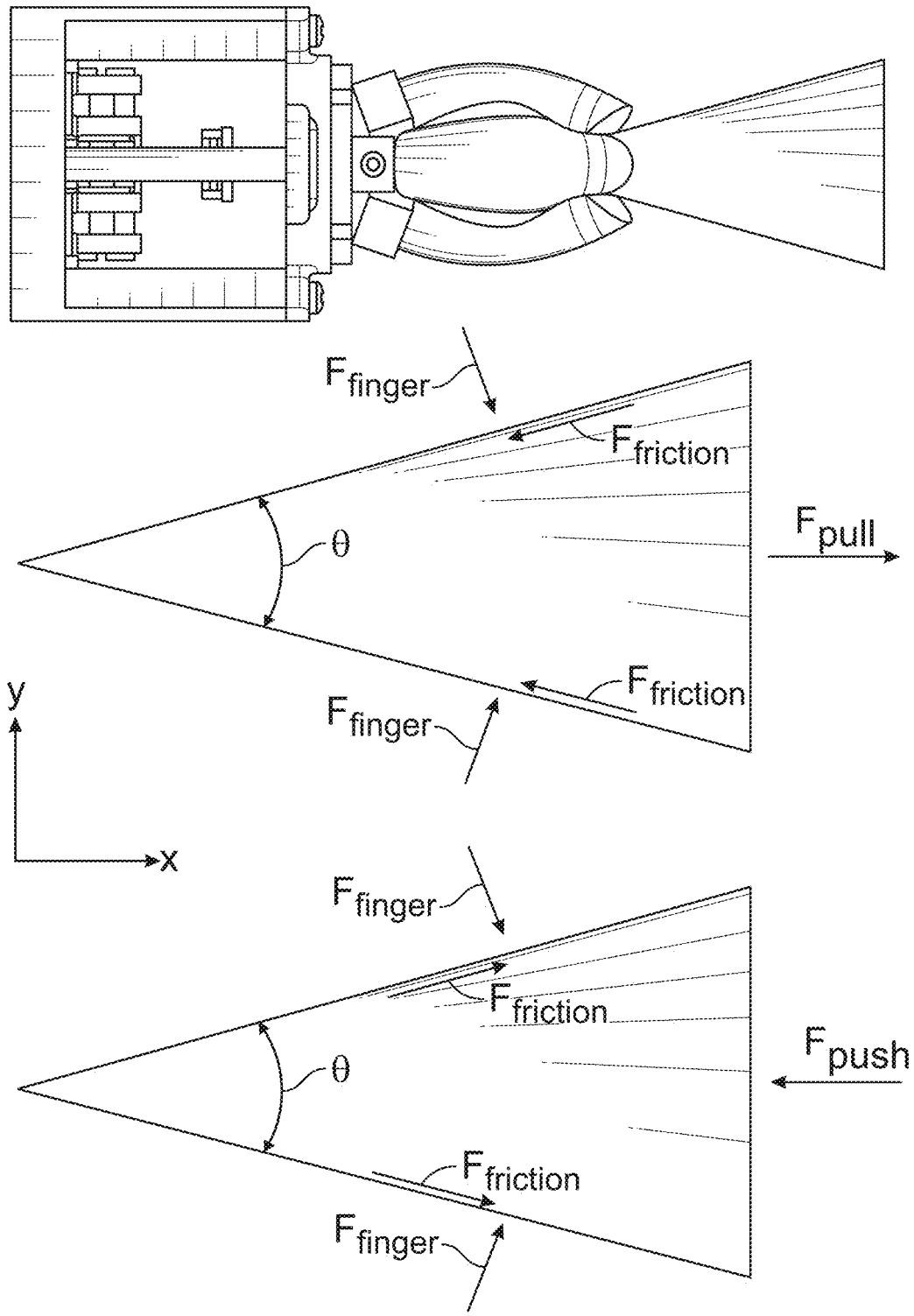
FIG. 15 is a 2D representation of the experimental setup used to characterize the gripper, which is equivalent to the 3D setup due to the axial symmetry of the cone and gripper.

The relationship between tendon retraction, object diameter, and fingertip force may be calculated by considering the free body diagrams in the pushing and pulling scenarios, as shown in FIG. 15. By summing the forces in the direction the cone is traversing, equation (1) and (2) were obtained for the pulling and pushing configuration, respectively.

$$\sum F_{x,pull}: \ F_{pull} = n\left(-F_{finger} \sin\left(\frac{\theta}{2}\right) + \mu F_{finger} \cos\left(\frac{\theta}{2}\right)\right) \quad (1)$$

$$\sum F_{x,push}: \ -F_{push} = n\left(-F_{finger} \sin\left(\frac{\theta}{2}\right) - \mu F_{finger} \cos\left(\frac{\theta}{2}\right)\right) \quad (2)$$

Where $F_{finger}$ is the force applied by each fingertip normal to the cone, n is the number of fingers on the gripper, θ is the cone angle, μ is the coefficient of kinetic friction, and $F_{push}$ and $F_{pull}$ are the forces measured in the pushing and pulling tests, respectively. By adding (1) and (2), and solving for $F_{finger}$, the below is obtained:

$$F_{finger} = \frac{F_{push} - F_{pull}}{2n * \sin\left(\frac{\theta}{2}\right)} \quad (3)$$

Knowing the results set forth above, the normal force applied by the gripper at a given tendon retraction can be solved for numerous object diameters efficiently.

Figure 16:
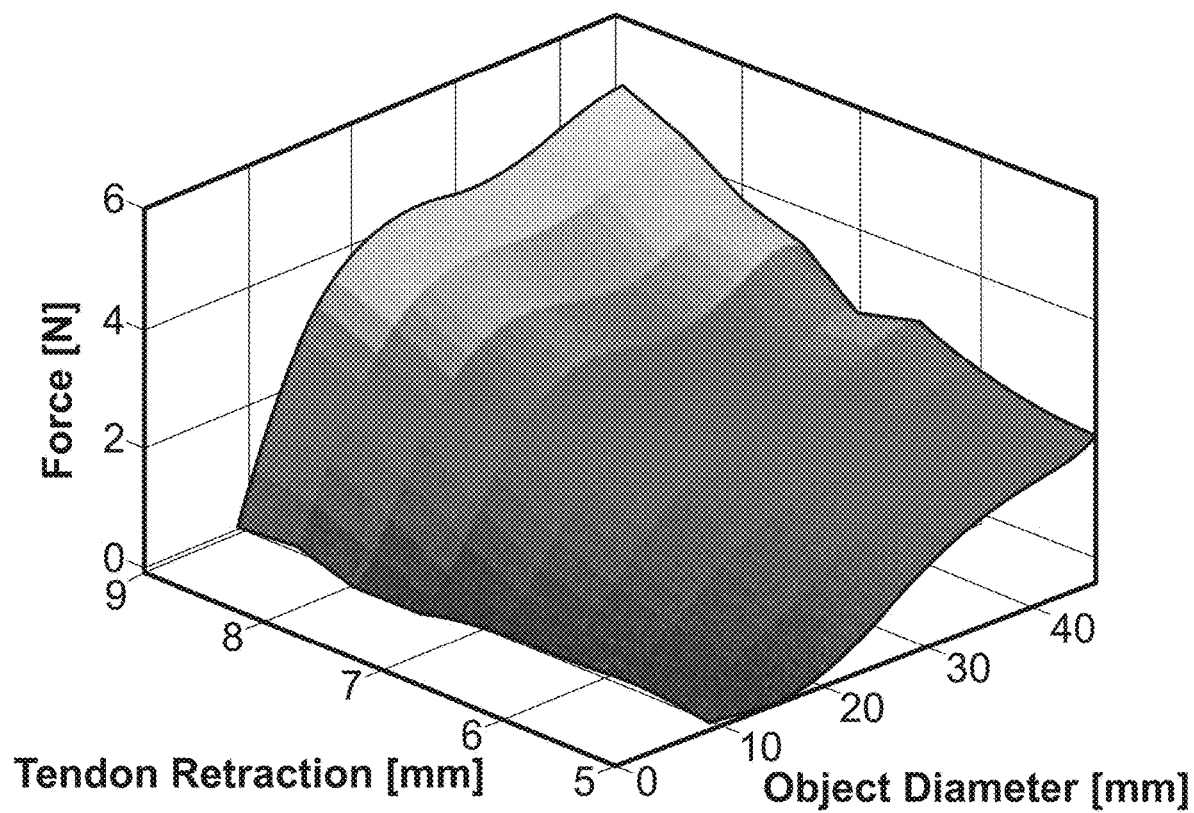
FIG. 16 depicts the calculated gripping forces at different object diameters for tendon retraction lengths of 5-9 mm.

Experimental results from the two truncated cones were normalized to produce continuous data at gripping diameters ranging from 9 to 47 mm. The results can be seen in FIG. 16. The maximum fingertip force, which was calculated from the pushing and pulling forces, was determined to be 4.92 N at an object diameter of 47 mm and a tendon retraction of 9 mm.

Grasping Versatility

Figure 17:
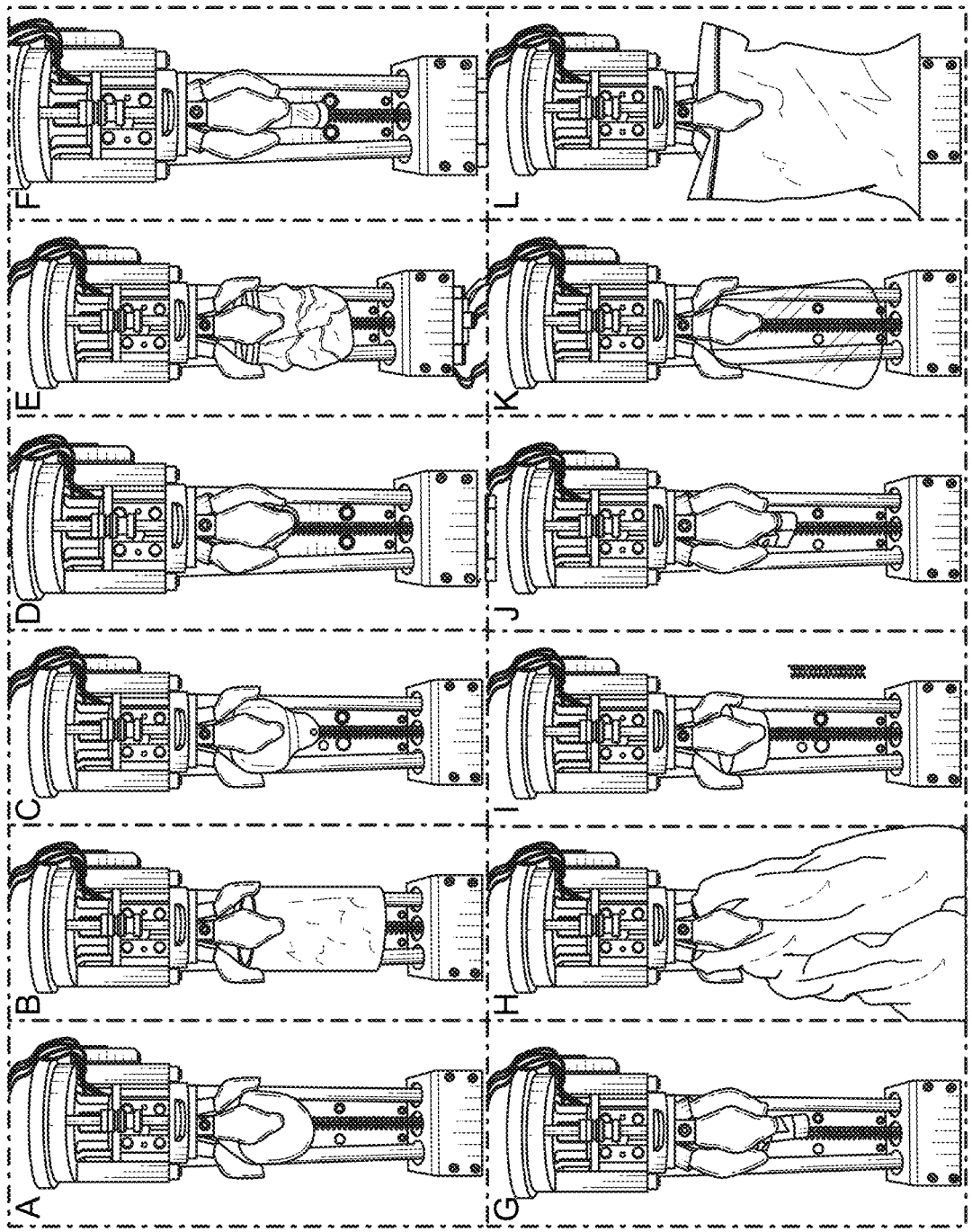
FIG. 17 shows the gripper being used to handle various objects. These objects are a tennis ball (A), a can of beans (B), a pear (C), a strawberry (D), a jar of pears (E), a screwdriver (F), a glue stick (G), a t-shirt (H), a pastry (I), a container of super glue (J), an upside-down plastic cup (K), and a bag of chips (L).

The grasping versatility of the gripper is illustrated by the handling of objects that are a part of activities of daily living as seen in FIG. 17. These objects were selected such that there was a variety in geometry, stiffness, weight, and compliance for testing the efficacy of the gripper. The ability of this gripper to delicately grip soft objects is clearly represented by FIG. 17 I, where the gripper is used to hold a pastry. Conversely, the strength of the gripper is displayed by its ability to hold a can of beans and a jar of pears as shown in FIG. 17 B and FIG. 17 E, respectively. Finally, the ability of the gripper to hold compliant objects is verified by the handling of the T-shirt in FIG. 17 H and the bag of chips of FIG. 17 L.

It should be noted that the internal plastic tip used to terminate the tendon within the silicone fingers provided useful mechanical advantage as illustrated in FIGS. 17 B and E. For these objects, the gripper fingers are forced into an angle greater than the initial offset angle of 20°, which could potentially cause an inability to grasp these large diameter objects without assistance; however, as the tendon is retracted, the internal plastic component essentially wraps around the lip of the can and the lid of the jar, creating inherent mechanical advantage. This is similar in the way that human fingers can curl around a small object, reducing the need to rely on frictional grasping.

Field Test

The results of the field test harvesting can be seen in Table 2. RDR [%] was the percentage of 60 berries that were harvested and stored in a clamshell at 2° C. for 21 days that succumbed to red drupelet reversion, a post-harvest disorder where the drupelets on the blackberry turn from black to red. Reliability [%] refers to the number of berries harvested divided by the total number of harvesting attempts, in this case 60 per trial. The harvest time refers to the amount of time required to approach a berry, grasp it, remove it from the plant, and place it in a separate holding vessel.

In the force feedback tests, reliability, speed, and RDR [%] were inversely related to the applied force. It should be noted that harvest time can be reduced by tuning the PD gains to decrease response time. The blackberries that were harvested manually and with FB 1 did not have any RDR. Interestingly, when using no force feedback with the gripper, RDR [%] and response time are reduced when compared to the force feedback method with a desired force of 0.78 N. However, reliability suffers as a consequence of the lack of active force feedback. These results indicate that the cylindrical support attached to the FlexiForce sensor causes damage to the berry surface. To combat this issue, the force sensing interface should be removed from the fingertips, and a mapping between the joint space force (gripper force), task space force (tendon force), and berry diameter should be performed.

TABLE 2

Results of Harvesting Blackberries with Varying Force Feedback

| Parameter | FB 1[i] | FB 2 | FB 3 | No FB[ii] | Hand[iii] |
|---|---|---|---|---|---|
| Desired Force [N] | 0.59 | 0.69 | 0.78 | N/A | N/A |
| Reliability [%] | 77.92 | 86.96 | 95.24 | 85.71 | 100.00 |
| Harvest Time [s] | 8.10 | 7.30 | 4.80 | 3.50 | 1.40 |
| Red Drupelet Reversion [%] | 0.00 | 8.00 | 16.00 | 0.00 | 0.00 |

[i]FB refers to a gripper test that utilized the force sensors to irovide force feedback during harvesting.
[ii]No FB refers to a gripper test that had the force sensors removed during harvesting, A maximum tendon retraction of 4 mm was used for each berry.
[iii]Hand refers to a test where berries were harvested by hand.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above-described embodiments, methods, and examples, but by all embodiments and methods within the scope and spirit of the disclosure.

What is claimed is:

1. A system for harvesting berries comprising a tendon-driven gripper, attached to an arm, having fingers made of a compliant material which prevents unwanted damage to the berries; said gripper includes an internal backbone made of an elastic material; a mobile platform that moves either by tread, or by wheels, down the rows of blackberry; and said platform adapted to stop along its path and harvest berries by adjusting said gripper arm angle, gripper height, gripper reach, and the horizontal position of said gripper through linear actuators attached with respect to thesaid mobile platform.

2. The system of claim 1 further including solar panels for charging said mobile platform.

3. The system of claim 1 further including a docking station for charging said mobile platform.

4. The system of claim 1 further including cameras adapted to identify and locate berries with respect to said platform, permitting said gripper to be placed accurately with respect to a berry.

* * * * *